United States Patent
Jin

(10) Patent No.: US 10,126,853 B2
(45) Date of Patent: Nov. 13, 2018

(54) TOUCH LEAD ARRANGEMENT FOR AN ARRAY SUBSTRATE AND DISPLAY APPARATUS

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: Shanghai AVIC OPTO Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 15/383,790

(22) Filed: Dec. 19, 2016

(65) Prior Publication Data

US 2017/0097713 A1   Apr. 6, 2017

(30) Foreign Application Priority Data

Sep. 9, 2016 (CN) .......................... 2016 1 0816477

(51) Int. Cl.
*G06F 3/041* (2006.01)
*G02F 1/1339* (2006.01)
*G02F 1/1333* (2006.01)

(52) U.S. Cl.
CPC .......... *G06F 3/0412* (2013.01); *G02F 1/1339* (2013.01); *G02F 1/13338* (2013.01); *G06F 3/0416* (2013.01); *G02F 2202/28* (2013.01); *G06F 2203/04103* (2013.01)

(58) Field of Classification Search
CPC . G06F 3/041–3/047; G09G 2310/0281; G02F 2001/133388
See application file for complete search history.

(56) References Cited

U.S. PATENT DOCUMENTS

| | | | |
|---|---|---|---|
| 7,038,377 B2 * | 5/2006 | Kobayashi | H01L 27/3246 257/72 |
| 9,287,329 B1 * | 3/2016 | Lee | H01L 51/0097 |
| 9,727,167 B2 * | 8/2017 | Yang | G02F 1/1345 |

(Continued)

FOREIGN PATENT DOCUMENTS

| CN | 1741238 A | 3/2006 |
|---|---|---|
| CN | 103278980 A | 9/2013 |

(Continued)

*Primary Examiner* — Gene W Lee
(74) *Attorney, Agent, or Firm* — Kilpatrick Townsend & Stockton LLP

(57) ABSTRACT

An array substrate and a display apparatus are provided. The array substrate includes a display area and a non-display area surrounding the display area, wherein the non-display area includes a frame sealing adhesive area, a plurality of touch leads and a plurality of touch signal output terminals. The plurality of touch signal output terminals are electrically connected with the plurality of touch leads, respectively, and the plurality of touch signal output terminals input a touch signal to the display area via the touch lead. A minimum distance between two adjacent touch leads in the frame sealing adhesive area is greater than a minimum distance between two adjacent touch signal output terminals correspondingly connected to said two adjacent touch leads.

10 Claims, 7 Drawing Sheets

(56) References Cited

U.S. PATENT DOCUMENTS

2006/0043877 A1* 3/2006 Inoue .................. H01J 29/90
                                                        313/496
2010/0108409 A1* 5/2010 Tanaka ................. G06F 3/044
                                                       178/18.06

FOREIGN PATENT DOCUMENTS

CN     105068373 A    11/2015
CN     105653087 A     6/2016

* cited by examiner

TOUCH LEAD ARRANGEMENT FOR AN ARRAY SUBSTRATE AND DISPLAY APPARATUS

CROSS-REFERENCE TO RELATED APPLICATIONS

This application is based upon and claims priority to Chinese Patent Application 201610816477.6, filed on Sep. 9, 2016, the entire contents of which are incorporated herein by reference.

TECHNICAL FIELD

This disclosure generally relates to the field of display technology, and more particularly, to an array substrate and a display apparatus.

BACKGROUND

An array substrate generally includes a display area and a non-display area disposed at an outer periphery of the display area. The display area is configured to dispose a pixel array, and the non-display area is configured to provide a gate driving circuit for providing scan signals to each pixel in the pixel array and a source driving circuit for providing data signals to each pixel. In the non-display area, a fan-out area for arranging leads from the display area to the gate driving circuit and/or source driving circuit is further provided.

The above information disclosed in this background section is only for enhancement of understanding of the background of the invention and therefore it may contain information that does not form the prior art that is already known to a person of ordinary skill in the art.

SUMMARY

This disclosure provides an array substrate and a display apparatus.

Other features and advantages will become apparent by the following detailed description, or in part, may be learned by implementing this disclosure.

According to one aspect, this disclosure provides an array substrate including a display area and a non-display area surrounding the display area, wherein the non-display area includes:

a frame sealing adhesive area;

a plurality of touch leads; and a plurality of touch signal output terminals electrically connected with the plurality of touch leads, respectively, and the plurality of touch signal output terminals inputting a touch signal to the display area via the touch leads, wherein a minimum distance between two adjacent touch leads in the frame sealing adhesive area is greater than a minimum distance between two adjacent touch signal output terminals correspondingly connected to said two adjacent touch leads.

According to an aspect of this disclosure, there is providing a display apparatus including the above array substrate.

It is to be understood that both the foregoing general description and the following detailed description are exemplary and explanatory only and are not restrictive of this disclosure, as claimed.

BRIEF DESCRIPTION OF THE DRAWINGS

The above and other objectives, features and advantages of this disclosure will become more apparent by describing its example embodiments in detail with reference to the accompanying drawings.

DETAILED DESCRIPTION

Figure 1:
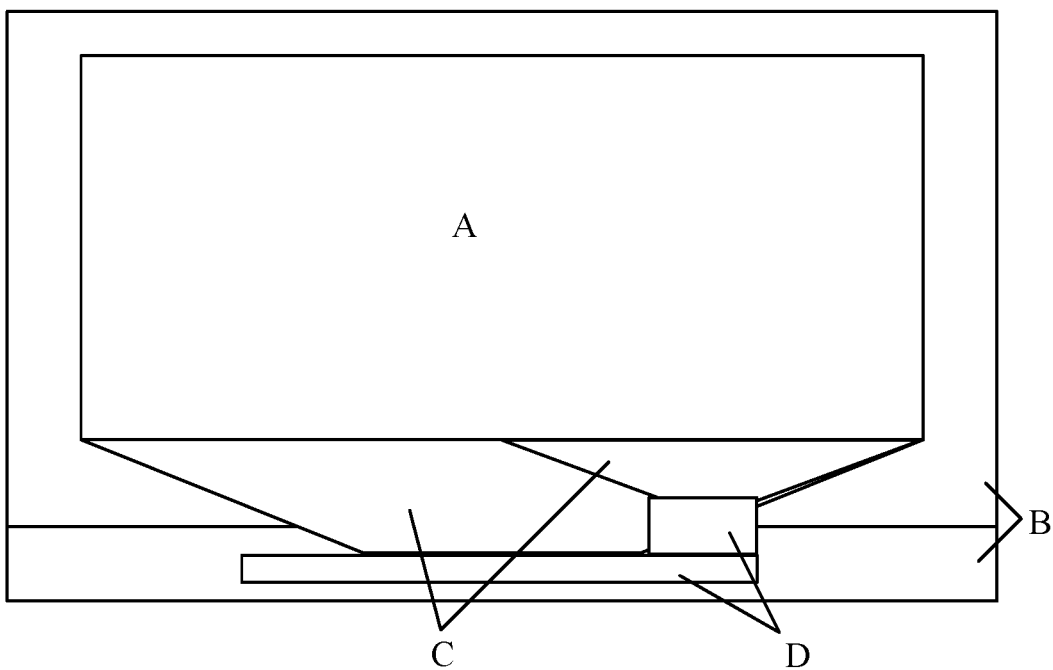
FIG. 1 schematically illustrates a structural diagram of an array substrate in a touch screen according to the prior art.

Exemplary embodiments will now be described more fully with reference to the drawings. The exemplary embodiments, however, may be implemented in various forms, and should not be construed as being limited to the implementations set forth herein; instead, the implementations are provided such that this disclosure will be through and complete, and will fully convey the concept of exemplary embodiments to those skilled in the art. The accompanying drawings are only schematic illustration of this disclosure, and may be not drawn to scale. In the drawings, the same reference numerals denote the same or similar structures, thus their detailed description will be omitted.

In addition, the features, structures or characteristics described herein can be combined in one or more embodiments in any appropriate way. In the description hereinafter, many specific details are provided for fully understanding of the embodiments of this disclosure. However, it will be appreciated by those skilled in the art that the technical solution of this disclosure can be practiced without one or more of the specific details, or with other methods, components, devices or steps, etc. In addition, known structures, methods, devices, implementations, materials or operations will not be illustrated or described in detail, to avoid obscuration of the aspects of this disclosure.

Some block diagrams in the accompanying drawings represent some functional entities, which do not necessarily correspond to physical or logical independent entities. These functional entities may be implemented in the form of software, or in one or more hardware modules or integrated circuits, or in various networks and/or processing apparatus and/or micro control apparatus.

With respect to a touch screen, FIG. 1 illustrates a structural schematic diagram of the array substrate of the touch screen in the prior art, and the array substrate includes a display area A and a non-display area B disposed at an outer periphery of the display area A. A fan-out area C (wherein FIG. 1 illustrates two fan-out areas) and an integrated circuit (IC) area D adjacent to the fan-out area C (wherein FIG. 1 also illustrates two corresponding IC areas) are disposed in the non-display area B. Herein, FIG. 1 only illustrates the detailed structure of the lower frame of the array substrate, and other frame structures are omitted in FIG. 1. A frame sealing adhesive may be provided in the non-display area. The frame sealing adhesive is an adhesive that bonds the upper and lower substrates together to keep a certain gap therebetween, seals the injected liquid crystal to prevent leakage, and meanwhile prevents the entry of external pollutants. The frame sealing adhesive is generally applied at an edge of the array substrate and/or color filter substrate, and in particular, in the non-display area. After curing the cell and the frame sealing adhesive, the liquid crystal panel is formed. An edge of the frame sealing adhesive extends inward and outward by a certain distance to form a frame sealing adhesive area. In the frame sealing adhesive area, a total light transmittance is calculated as follow.

A total light transmittance=an area of the transparent area/a general area.

Herein, the area of the transparent area=the general area−an area of metal.

Accordingly, the total light transmittance=(the general area−the area of metal)/the general area=1−the area of metal/the general area.

Herein, a minimum distance between the touch leads in the vertical direction in the fan-out area C is equal to a minimum distance between the corresponding touch signal output terminals, which leads to a relatively lower total light transmittance in the area having the vertical wirings in the frame sealing adhesive area, leads to insufficient curing of the frame sealing adhesive, and in turn leads to failure in reliability tests.

Accordingly, a new array substrate and a display apparatus are required.

Figure 2:
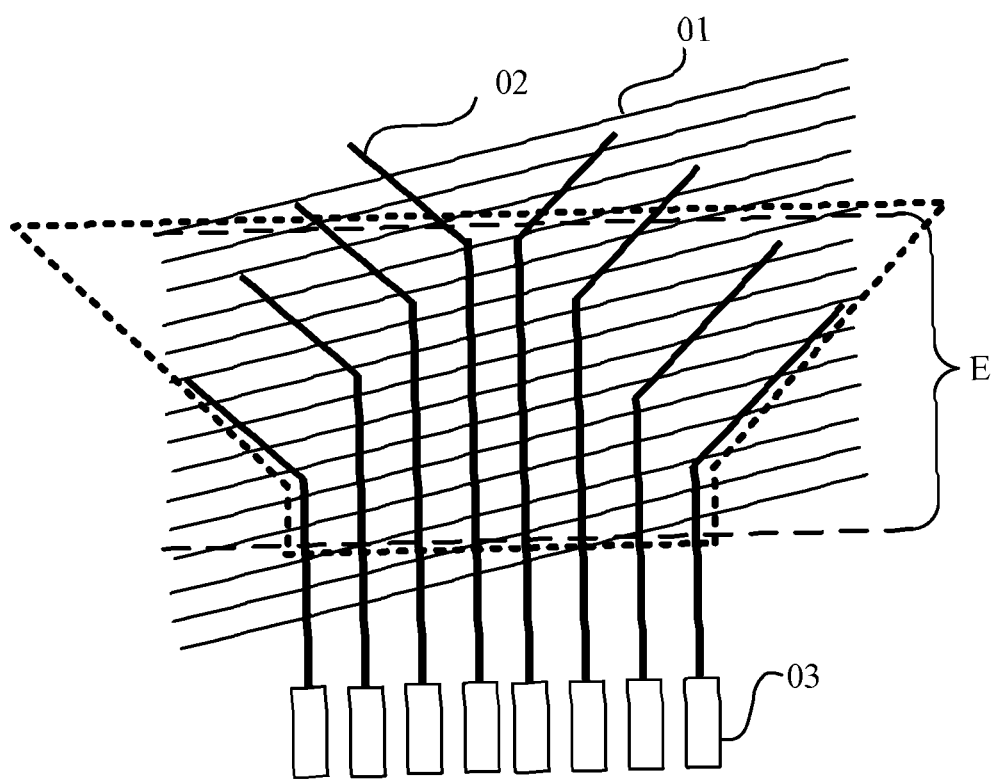
FIG. 2 schematically illustrates an arrangement of the leads in a portion of the fan-out area C on an array substrate according to the prior art.

FIG. 2 illustrates an arrangement of the leads in a portion of the fan-out area C. As can be seen from FIG. 1, generally, two fan-out areas provided with driving leads 01 and touch leads 02 (which are referred to as a driving fan-out area and a touch fan-out area, respectively) are partly overlapped with the two kind of leads insulated from one another. FIG. 2 mainly illustrates a touch fan-out area provided with the touch lead 02 and the driving lead 01 overlapped with the touch fan-out area. Herein, both ends of the driving lead 01 are connected with a source driving circuit in the pixel unit and integrated circuit area in the display area, respectively. Both ends of the touch lead 02 are connected with the touch lead 02, generally a touch signal output terminal 03, of the touch driving circuit in the touch unit and integrated circuit area in the display area, respectively. Generally, an overlapped area between the driving lead 01 and the touch lead 02 is applied with frame sealing adhesive (not illustrated), and a frame sealing adhesive area E is formed by extending both inwardly and outwardly from the edge of the frame sealing adhesive by a certain distance. As illustrated in FIG. 2, in the frame sealing adhesive area E, a minimum distance between two adjacent touch leads 02 extending in the vertical direction is equal to that between corresponding touch signal output terminals 03, thereby causing a light transmittance in the vertically wired area in the frame sealing adhesive area E to be relatively small.

A total light transmittance may be increased by increasing an area of the general area or reducing metal area. In this embodiment, an area surrounded by outmost touch leads 02 of the plurality of touch leads and the frame sealing adhesive area E may be referred to as a general area. Accordingly, a total light transmittance may be increased by increasing the area surrounded by outmost touch leads 02 of the plurality of touch leads and the frame sealing adhesive area E. Further, in this embodiment, an area occupied by the metal forming the wirings (e.g., the touch leads and the driving leads) may be referred as the metal area. Accordingly, a total light transmittance may be increased by reducing the area occupied by the metal forming the wirings. In the technical solution provided in this disclosure, the total light transmittance may be increased by increasing the area of the general area.

Based on the above description, an array substrate is provided in embodiments of this disclosure, the array substrate includes a display area and a non-display area surrounding the display area. The non-display area includes: a frame sealing adhesive area and a plurality of touch signal output terminals. The frame sealing area includes a plurality of touch leads. The plurality of touch signal output terminals are electrically connected to the touch leads, respectively, and the plurality of touch signal output terminals input touch signals to the display area via the touch leads. Herein, a minimum distance between two adjacent touch leads in the frame sealing adhesive area is greater than a minimum distance between two adjacent touch signal output terminals correspondingly connected to said two adjacent touch leads.

In the array substrate provided in this disclosure, by improving the arrangement of the touch leads in the frame sealing adhesive area, the minimum distance between the touch leads in the frame sealing adhesive area is increased. In this way, the minimum distance between two adjacent touch leads in the frame sealing adhesive area is greater than a minimum distance between two adjacent touch signal output terminals correspondingly connected to said two adjacent touch leads, thereby increasing an area of the general area and in turn increasing a total light transmittance.

With respect to increasing the minimum distance between the touch leads in the frame sealing adhesive area, various options and schemes may be available while designing the particular wiring, and some of them are described hereinafter, for example.

Figure 3:
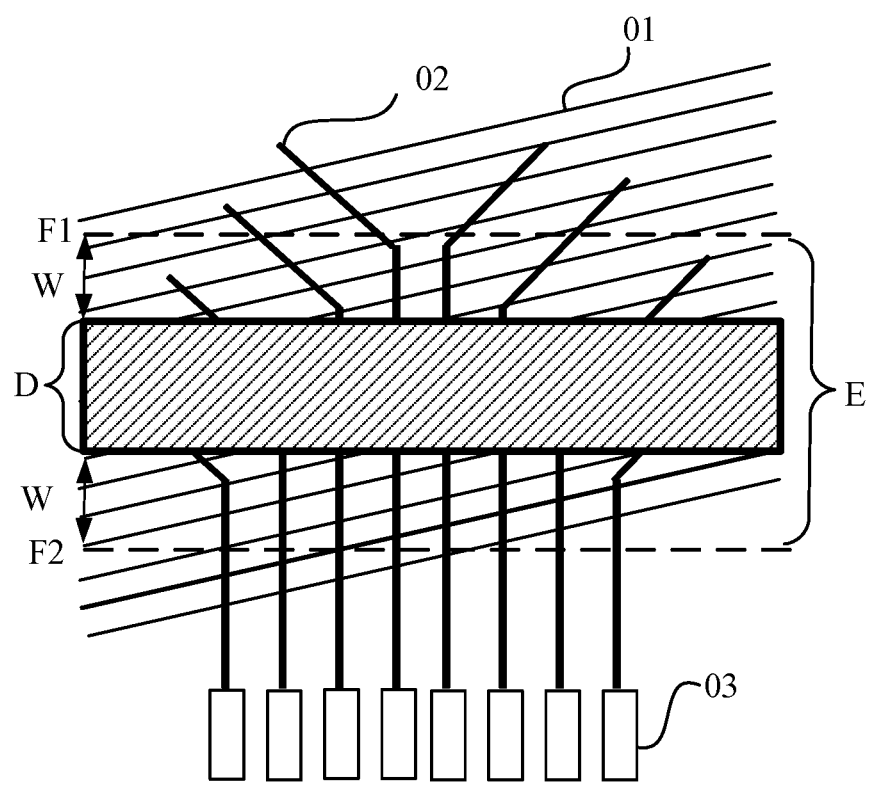
FIG. 3 schematically illustrates a schematic diagram of a frame sealing adhesive and a frame sealing adhesive area according to an embodiment of this disclosure.

This disclosure provides an array substrate as illustrated in FIG. 3, which illustrates a schematic diagram of the frame sealing adhesive and the frame sealing adhesive area in this embodiments. The array substrate includes the display area and the non-display area surrounding the display area, and the non-display area includes: the frame sealing adhesive area and a plurality of touch signal output terminals, wherein the frame sealing adhesive area includes a plurality of touch leads 02; the plurality of touch signal output terminals 03 are electrically connected to the touch leads 02, respectively, and the plurality of touch signal output terminals 03 input the touch signal to the display area via the touch leads 02. An area within the frame sealing adhesive is a liquid crystal cell. In this embodiment, an area surrounding the frame sealing adhesive is defined as the frame sealing adhesive area, that is, the frame sealing adhesive area E is an area formed between a first edge extending from the frame sealing adhesive D towards the display area and a second edge extending from the frame sealing adhesive D away from the display area. In particular, a distance between the edge of the frame sealing adhesive area E and a closest edge of the frame sealing adhesive D is equal to or smaller than 150 μm.

The area formed between the first edge F1 extending from the frame sealing adhesive D towards the display area and the second edge F2 extending from the frame sealing adhesive away from the display area is referred to as the frame sealing adhesive area E. As illustrated in FIG. 3, W represents the distance between the edge of the frame sealing adhesive area and the closest edge of the frame sealing adhesive, and W≤150 µm.

Figure 4:
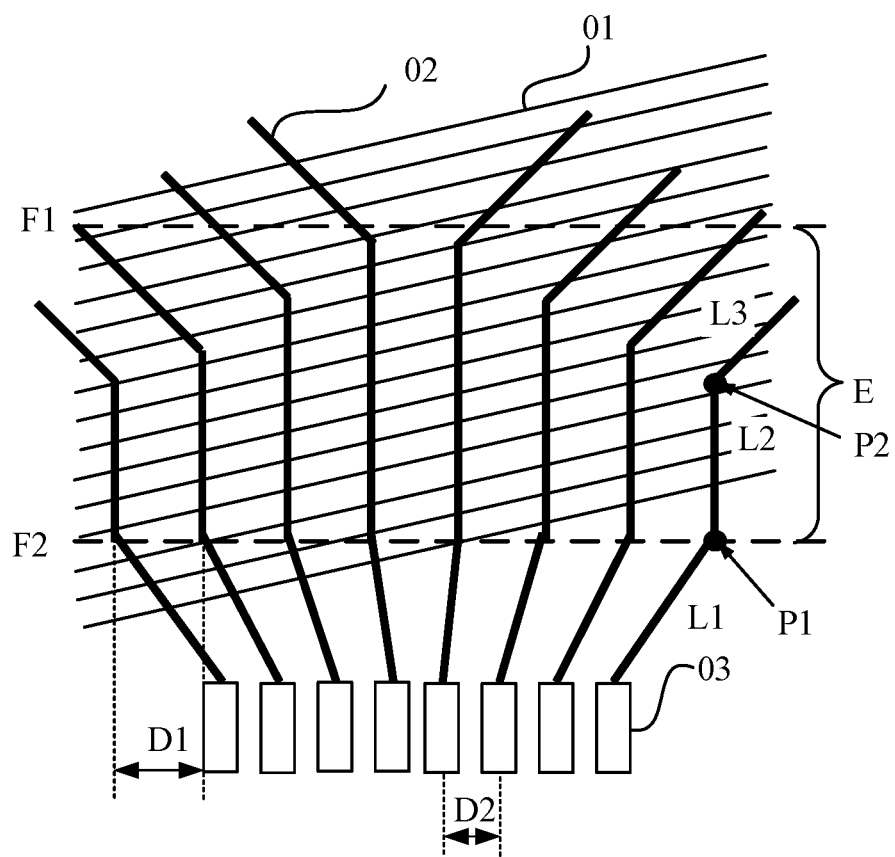
FIG. 4 schematically illustrates a schematic diagram of a portion of the non-display area on an array substrate according to an embodiment of this disclosure.

FIG. 4 illustrates a schematic diagram of a portion of the non-display area on the array substrate according to an embodiment of this disclosure, wherein a portion of the touch lead 02 in the frame sealing adhesive area E has at least one turning point.

As illustrated in FIG. 4, the touch lead 02 includes three portions, and each touch lead 02 is respectively indicated by L1, L2, and L3 from an end connected to the touch signal output terminal 03. In this embodiment, a first turning point P1 lies at the intersection between the portions L1 and L2, and a second turning point P2 lies at the intersection between the portions L2 and L3. As illustrated in FIG. 4, the first turning point P1 is positioned at an edge (i.e., the edge F2) of the frame sealing adhesive area E, and the second turning point P2 is positioned in the frame sealing adhesive area E. Since the touch lead 02 has two turning points P1 and P2, a distance between the touch leads in the area in which the wiring of the touch lead in the vertical direction in the frame sealing adhesive area E overlaps the frame sealing adhesive area E is different from a distance between the touch signal output terminals 03. In particular, the minimum distance D1 between two adjacent touch leads 02 in the frame sealing adhesive area E is greater than a minimum distance D2 between two adjacent touch signal output terminals 03 correspondingly connected to said two adjacent touch leads.

In this embodiment, an area surrounded by outmost touch leads 02 of the plurality of touch leads and the frame sealing adhesive area E is referred to as a general area. An area of the general area increases as the distance between the outmost two touch leads 2 increases. Accordingly, an area of the overlapped area between the touch lead 02 and the frame sealing adhesive area E may be increased, such that a total light transmittance may be increased. According to the improvement of the wiring of the touch lead 02 in this embodiment, the general area may have a light transmittance equal to or greater than 35%.

Further, as illustrated in FIG. 4, a plurality of driving leads 01 are provided in the frame sealing adhesive area E to provide driving signals to pixel units in the display area. Both ends of the driving leads 01 are respectively connected with the pixel units in the display unit and the driving signal output terminals 03 in the non-display area, wherein the driving signal output terminals 03 are generally disposed in the integrated circuit area, in particular, are connected to driving circuit. Although an overlapped portion exists between the touch lead 02 and the driving lead 01 in the frame sealing adhesive area, they will not be affected by signal interference since they are positioned in different layers and are insulated from one another.

Accordingly, this embodiment may perform the technical effects as follow.

By improving the arrangement of the touch leads in the frame sealing adhesive area, a portion of the touch lead in the frame sealing adhesive area has at least one turning point, and thus a minimum distance between the touch leads in the frame sealing adhesive area is increased. Accordingly, the minimum distance between two adjacent touch leads in the frame sealing adhesive area is greater than a minimum distance between two adjacent touch signal output terminals correspondingly connected to said two adjacent touch leads, thereby increasing an area of the general area and in turn increasing a total light transmittance.

Figure 5:
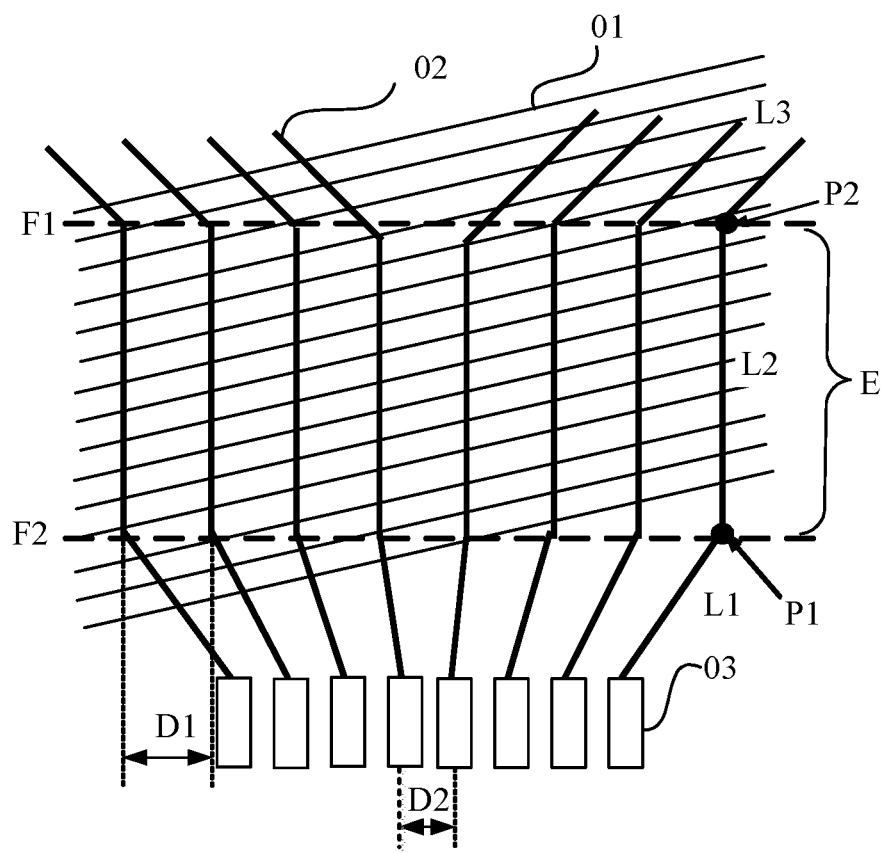
FIG. 5 schematically illustrates a schematic diagram of a portion of the non-display area on an array substrate according to another embodiment of this disclosure.

FIG. 5 illustrates a schematic diagram of a portion of the non-display area on the array substrate according to another embodiment of this disclosure, wherein a portion of the touch lead 02 at the edge of the frame sealing adhesive area E has a turning point.

As illustrated in FIG. 5, the touch lead 02 includes three portions, and each touch lead 02 is respectively indicated by L1, L2, and L3 from an end connected to the touch signal output terminal 03. In this embodiment, a first turning point P1 lies at the intersection between the portions L1 and L2, and a second turning point P2 lies at the intersection between the portions L2 and L3. As illustrated in FIG. 5, the first turning point P1 is positioned at an edge (i.e., the edge F2) of the frame sealing adhesive area E, and the second turning point P2 is positioned at the other edge (i.e., the edge F1) of the frame sealing adhesive area E. Since the touch lead 02 has two turning points P1 and P2, a distance between the touch leads in the area in which the wiring of the touch lead in the vertical direction in the frame sealing adhesive area E overlaps the frame sealing adhesive area E is different from a distance between the touch signal output terminals. In particular, the minimum distance D1 between two adjacent touch leads in the frame sealing adhesive area E is greater than a minimum distance D2 between two adjacent touch signal output terminals correspondingly connected to said two adjacent touch leads.

In this embodiment, since a turning point exists at the edge of the frame sealing adhesive area E (e.g., the first turning point P1 at the edge F2), the distance between the outmost two touch leads 02 may also increase. That is, an area of the general area increases, and thus an area of the overlapped area between the touch lead 02 and the frame sealing adhesive area E may be increased, such that a total light transmittance may be increased by improving the wiring of the touch leads 02.

Further, as illustrated in FIG. 5, a plurality of driving leads 01 are also provided in the frame sealing adhesive area E, and the driving leads 01 and the touch leads 02 are positioned in different layers and are insulated from one another. The function and effect thereof are the same as those in FIG. 4, and thus will not be repeated herein.

Accordingly, this embodiment may perform the technical effects as follow.

By improving the arrangement of the touch leads in the frame sealing adhesive area, a portion of the touch lead at the edge of the frame sealing adhesive area (i.e., the edge F1 and the edge F2) has at a turning point, and thus a minimum distance between the touch leads in the frame sealing adhesive area is increased. Accordingly, the minimum distance between two adjacent touch leads in the frame sealing adhesive area is greater than a minimum distance between two adjacent touch signal output terminals correspondingly connected to said two adjacent touch leads, thereby increasing an area of the general area and in turn increasing a total light transmittance.

Figure 6:
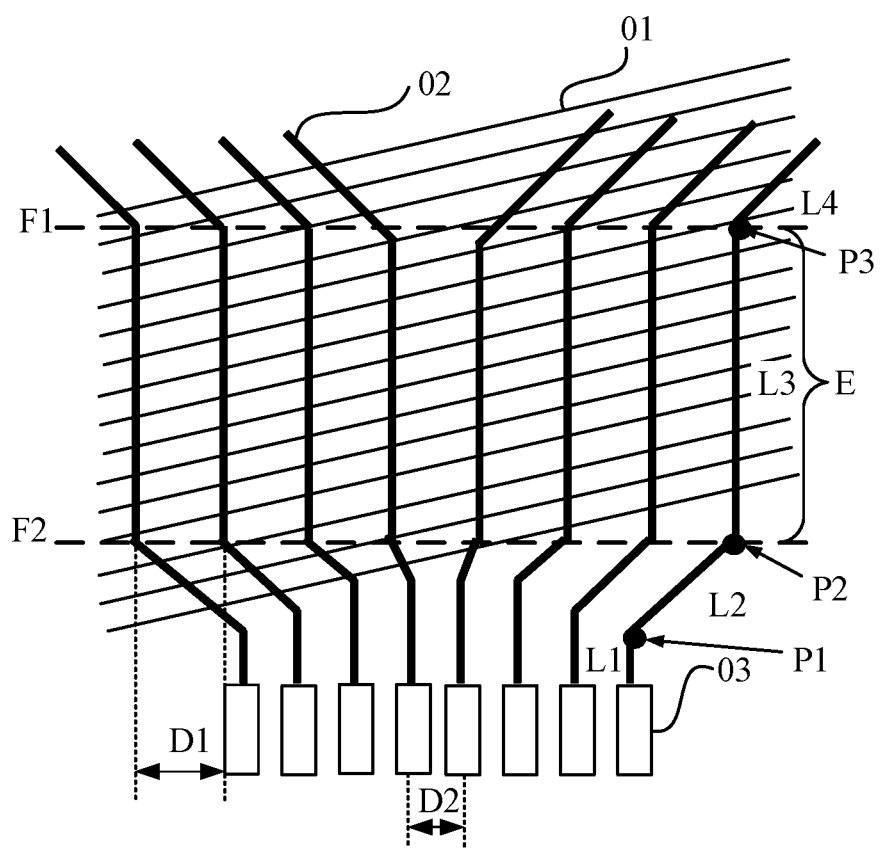
FIG. 6 schematically illustrates a schematic diagram of a portion of the non-display area on an array substrate according to yet another embodiment of this disclosure.

FIG. 6 illustrates a schematic diagram of a portion of the non-display area on the array substrate according to yet another embodiment of this disclosure, wherein a portion of the touch lead 02 between the frame sealing adhesive area E and the touch signal output terminal has at least one turning point.

As illustrated in FIG. 6, the touch lead 02 includes four portions, and each touch lead 02 is respectively indicated by L1, L2, L3 and L4 from an end connected to the touch signal output terminal 03. In this embodiment, a first turning point P1 lies at the intersection between the portions L1 and L2, a second turning point P2 lies at the intersection between the portions L2 and L3, and a third turning point P3 lies at the intersection between the portions L3 and L4. As illustrated in FIG. 6, the first turning point P1 is positioned at a portion of the touch lead 02 between the frame sealing adhesive area E and the touch signal output terminal 03 (i.e., the portion between the edge F2 and the touch signal output terminal 03 illustrated in FIG. 6), the second turning point P2 is positioned at an edge (i.e., the edge F2) of the frame sealing adhesive area E, and the third turning point P3 is positioned at the other edge (i.e., the edge F1) of the frame sealing adhesive area E. Since the touch lead 02 has three turning points P1, P2 and P3, a distance between the touch leads in the area in which the wiring of the touch lead in the vertical direction in the frame sealing adhesive area E overlaps the frame sealing adhesive area E is different from a distance between the touch signal output terminals 03. In particular, the minimum distance D1 between two adjacent touch leads 02 in the frame sealing adhesive area E is greater than a minimum distance D2 between two adjacent touch signal output terminals 03 correspondingly connected to said two adjacent touch leads 02.

In this embodiment, since a turning point exists between the touch lead 02 in the frame sealing adhesive area E and the touch signal output terminal 03, the distance between the outmost two touch leads 02 may also increase. That is, an area of the general area increases, and thus a total light transmittance may be increased.

Further, as illustrated in FIG. 6, a plurality of driving leads 01 are also provided in the frame sealing adhesive area E, and the driving leads 01 and the touch leads 02 are positioned in different layers and are insulated from one another. The function and effect thereof are the same as those in FIG. 4, and thus will not be repeated herein.

Accordingly, this embodiment may perform the technical effects as follow.

By improving the arrangement of the touch leads in the frame sealing adhesive area, both a portion of the touch lead between the frame sealing adhesive area and the touch signal output terminal and a portion of the touch lead at the edge of the frame sealing adhesive area (i.e., the edge F1 and the edge F2) have turning points, and thus a minimum distance between the touch leads in the frame sealing adhesive area is increased. Accordingly, the minimum distance between two adjacent touch leads in the frame sealing adhesive area is greater than a minimum distance between two adjacent touch signal output terminals correspondingly connected to said two adjacent touch leads, thereby increasing an area of the general area and in turn increasing a total light transmittance.

Figure 7:
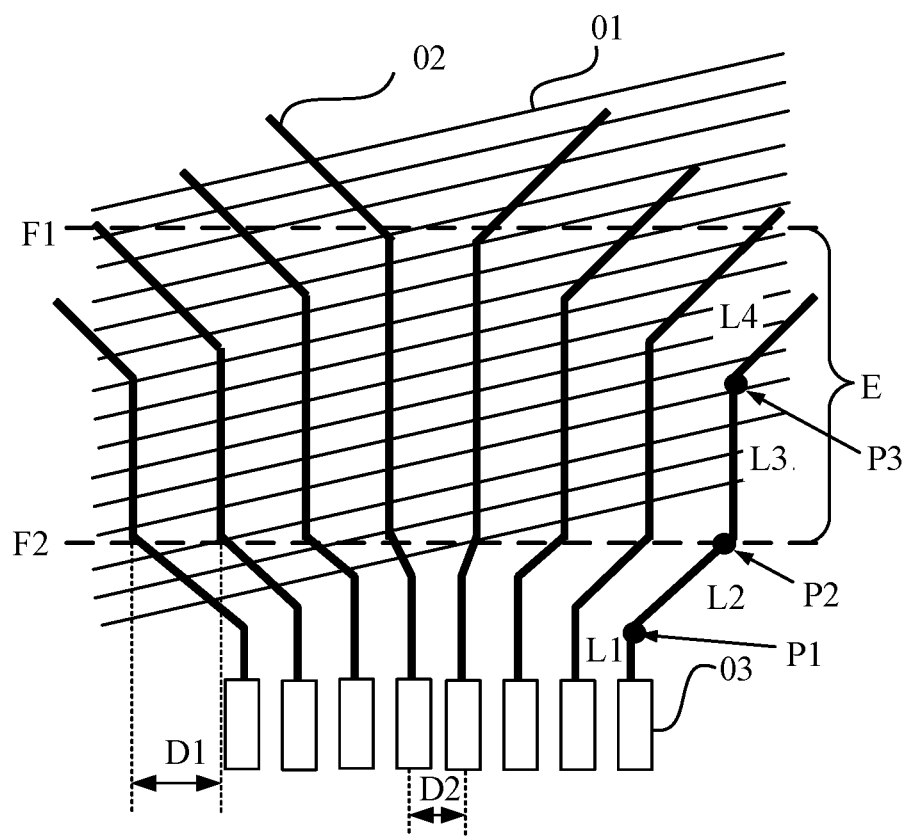
FIG. 7 schematically illustrates a schematic diagram of a portion of the non-display area on an array substrate according to still another embodiment of this disclosure.

FIG. 7 illustrates a schematic diagram of a portion of the non-display area on the array substrate according to still another embodiment of this disclosure, wherein both a portion of the touch lead 02 in the frame sealing adhesive area E and a portion of the touch lead 02 between the frame sealing adhesive area E and the touch signal output terminal 03 have at least one turning point.

As illustrated in FIG. 7, the touch lead 02 includes four portions, and each touch lead 02 is respectively indicated by L1, L2, L3 and L4 from an end connected to the touch signal output terminal 03. In this embodiment, a first turning point P1 lies at the intersection between the portions L1 and L2, a second turning point P2 lies at the intersection between the portions L2 and L3, and a third turning point P3 lies at the intersection between the portions L3 and L4. As illustrated in FIG. 7, the first turning point P1 of the touch lead 02 is positioned at a portion between the frame sealing adhesive area E and the touch signal output terminal 03 (i.e., the portion between the edge F2 and the touch signal output terminal 03 illustrated in FIG. 7), the second turning point P2 is positioned at an edge (i.e., the edge F2) of the frame sealing adhesive area E, and the third turning point P3 is positioned in the frame sealing adhesive area E. Since the touch lead 02 has three turning points P1, P2 and P3, a distance between the touch leads 02 in the area in which the wiring of the touch lead 02 in the vertical direction in the frame sealing adhesive area E overlaps the frame sealing adhesive area E is different from a distance between the touch signal output terminals 03. In particular, the minimum distance D1 between two adjacent touch leads 02 in the frame sealing adhesive area E is greater than a minimum distance D2 between two adjacent touch signal output terminals 03 correspondingly connected to said two adjacent touch leads 02.

In this embodiment, since the touch lead 02 has turning points both in the frame sealing adhesive area and the portion between the frame sealing adhesive area and the touch signal output terminal, the distance between the outmost two touch leads may also increase. That is, an area of the general area increases, thereby increasing a total light transmittance.

Further, as illustrated in FIG. 7, a plurality of driving leads 01 are also provided in the frame sealing adhesive area E, and the driving leads 01 and the touch leads 02 are positioned in different layers and are insulated from one another. The function and effect thereof are the same as those in FIG. 4, and thus will not be repeated herein.

Accordingly, this embodiment may perform the technical effects as follow.

By improving the arrangement of the touch leads in the frame sealing adhesive area, both a portion of the touch lead between the frame sealing adhesive area and the touch signal output terminal and a portion of the touch lead in the frame sealing adhesive area have turning points, and thus a minimum distance between the touch leads in the frame sealing adhesive area is increased. Accordingly, the minimum distance between two adjacent touch leads in the frame sealing adhesive area is greater than a minimum distance between two adjacent touch signal output terminals correspondingly connected to said two adjacent touch leads, thereby increasing an area of the general area and in turn increasing a total light transmittance.

It should be noted that the structures disclosed in FIGS. 4 to 7 are merely examples, which do not limit the implementations of this disclosure to these four types. In particular embodiments, numbers and positions of the turning points in the touch leads may be modified according to the design and special requirement of the wiring, and the technical effect of this disclose may be realized as long as that in the vertical wiring portion in the frame sealing adhesive area, the minimum distance between two adjacent touch leads is greater than the minimum distance between two adjacent touch signal output terminals correspondingly connected to said adjacent two touch leads, which will not be repeated herein.

Based on the structures disclosed in FIGS. 4 to 7 and other embodiments that are not repeated herein, this disclosure further provides a display apparatus including any one of the array substrate according to the embodiments of this disclosure.

It should be clearly appreciated that this disclosure disclosed how to form and use particular examples, while the principles of this disclosure are not limited to any details of these example. Rather, based on the teaching of the content disclosed in this disclosure, these principles are applicable to many other implementations.

Exemplary embodiments of this disclosure are illustrated and described above in detail. It should be appreciated that this disclosure is not limited to the detailed structures, configurations or implementations described herein; rather, this disclosure intends to cover various amendments and equivalents within the principle and scope of the appended claims.

What is claimed is:

1. An array substrate comprising a display area and a non-display area surrounding the display area, wherein the non-display area comprises:
   a frame sealing adhesive area;
   a plurality of touch leads; and
   a plurality of touch signal output terminals electrically connected with the plurality of touch leads, respectively, the plurality of touch signal output terminals inputting a touch signal to the display area via the touch leads,
   wherein a minimum distance between two adjacent touch leads extending in a first direction in the frame sealing adhesive area which is greater than a minimum distance between two adjacent touch signal output terminals correspondingly connected to said two adjacent touch leads, and wherein the minimum distance between two adjacent touch leads is measured according to a center of the touch leads along a second direction perpendicular to the first direction, and the minimum distance between the two adjacent touch signal output terminals is measured according to a center of the touch signal output terminals along the second direction, wherein the first direction is an extension direction of the touch signal output terminals.

2. The array substrate according to claim 1, wherein a portion of the touch lead in the frame sealing adhesive area has at least one turning point.

3. The array substrate according to claim 1, wherein a portion of the touch lead between the frame sealing adhesive area and the touch signal output terminal has at least one turning point.

4. The array substrate according to claim 1, wherein both a portion of the touch lead in the frame sealing adhesive area and a portion of the touch lead between the frame sealing adhesive area and the touch signal output terminal have at least one turning point.

5. The array substrate according to claim 1, wherein a portion of the touch lead positioned at an edge of the frame sealing adhesive area has a turning point.

6. The array substrate according to claim 1, wherein the frame sealing adhesive area is an area formed between a first edge extending from a frame sealing adhesive towards the display area and a second edge extending from the frame sealing adhesive away from the display area, and a distance between the first edge or the second edge and a closest edge of the frame sealing adhesive is equal to or smaller than 150 μm.

7. The array substrate according to claim 1, wherein an area surrounded by outmost touch leads of the plurality of touch leads and a first edge and a second edge of the frame sealing adhesive area is referred to as a general area, and wherein the general area has a light transmittance equal to or greater than 35%.

8. The array substrate according to claim 1, wherein the frame sealing adhesive area is further provided with a plurality of driving leads configured to provide driving signals to pixel units in the display area.

9. The array substrate according to claim 8, wherein the driving lead and the touch lead are positioned in different layers and are insulated from one another.

10. A display apparatus comprising:
    an array substrate which comprises:
    a display area and a non-display area surrounding the display area, wherein the non-display area comprises:
    a frame sealing adhesive area;
    a plurality of touch leads; and
    a plurality of touch signal output terminals electrically connected with the plurality of touch leads, respectively, the plurality of touch signal output terminals inputting a touch signal to the display area via the touch leads,
    wherein a minimum distance between two adjacent touch leads extending in a first direction in the frame sealing adhesive area which is greater than a minimum distance between two adjacent touch signal output terminals correspondingly connected to said two adjacent touch leads, and wherein the minimum distance between two adjacent touch leads is measured according to a center of the touch leads along a second direction perpendicular to the first direction, and the minimum distance between the two adjacent touch signal output terminals is measured according to a center of the touch signal output terminals along the second direction, wherein the first direction is an extension direction of the touch signal output terminals.

* * * * *